United States Patent
Kitahara et al.

(10) Patent No.: US 6,298,402 B1
(45) Date of Patent: Oct. 2, 2001

(54) METHOD FOR REWRITING DATA INCLUDING PROGRAM IN AN INFORMATION PROCESSING APPARATUS AND AN INFORMATION PROCESSING APPARATUS CAPABLE OF REWRITING DATA INCLUDING PROGRAM

(75) Inventors: Kiyoshi Kitahara, Tokyo; Noboru Uchida, Saitama; Kazuo Kishi, Tokyo, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/201,910

(22) Filed: Nov. 30, 1998

(51) Int. Cl.[7] .............................. G06F 13/00; G06F 15/78; H04M 11/00
(52) U.S. Cl. ......................... 710/74; 710/74; 455/418; 712/39
(58) Field of Search .................................. 455/418, 426; 712/39; 710/74; 714/35; 711/164

(56) References Cited

U.S. PATENT DOCUMENTS

| | | | |
|---|---|---|---|
| 5,400,389 | * 3/1995 | Niiyama et al. | 455/418 |
| 5,694,611 | * 12/1997 | Matsubara | 712/39 |
| 5,933,595 | * 8/1999 | Iizuka et al. | 714/35 |
| 6,094,698 | * 7/2000 | Namikawa | 710/74 |

* cited by examiner

Primary Examiner—Daniel H. Pan
Assistant Examiner—Te Yu Chen
(74) Attorney, Agent, or Firm—Finnegan, Henderson, Farabow, Garrett & Dunner, L.L.P.

(57) ABSTRACT

For rewriting data, which includes programs, stored in a programmable ROM, a receiving-side information processing apparatus first transfers a reception program included in the data stored in the ROM to a RAM. Control jumps to the reception program stored in the RAM, whereby reception is executed. Received data is written in the ROM according to the program stored in the RAM. The programs stored in the ROM can thus be rewritten.

10 Claims, 10 Drawing Sheets

METHOD FOR REWRITING DATA INCLUDING PROGRAM IN AN INFORMATION PROCESSING APPARATUS AND AN INFORMATION PROCESSING APPARATUS CAPABLE OF REWRITING DATA INCLUDING PROGRAM

FIELD OF THE INVENTION

The present invention relates to a method of rewriting data, which includes programs, residing in an information processing apparatus, and an information processing apparatus in which data, including programs, can be rewritten.

BACKGROUND OF THE INVENTION

In an information processing apparatuses such as a personal computer, a basic input-output system (BIOS) is stored in a read-only memory (ROM), and an operating system (OS), application programs, and data are stored in a hard disk. In the information processing apparatus, for starting up the system, the BIOS reads the OS and other facilities from the hard disk to a random access memory (RAM). An application program stored in the RAM is run on the other hand, in an information processing apparatus such as a portable terminal, a BIOS, an OS, application programs, and data are loaded in a ROM from the beginning. In the information processing apparatus, an application program already loaded in the ROM is run to start up the system.

In the information processing apparatus having the OS, application programs, and data stored in the ROM, when the system must be modified, the ROM is replaced with another or the data in the ROM is rewritten by a ROM writer. therein. This leads to an increase in cost. Moreover, the method using a ROM writer requires the special apparatus referred to as a ROM writer.

SUMMARY OF THE INVENTION

An object of the present invention is to provide a data rewriting method making it possible to readily rewrite data residing in an information processing apparatus in which the data including programs is stored in a programmable ROM.

Another object of the present invention is to provide an information processing apparatus in which data including programs is stored in a programmable ROM and the data can be rewritten readily.

The present invention attempts to accomplish the above objects.

An information processing apparatus in accordance with the present invention has data including programs stored in a programmable ROM. For rewriting data residing in the information processing apparatus according to the present invention, an information processing apparatus in which new data resides is connected to the information processing apparatus over a cable. The information processing apparatus having the new data shall be called a transmitting-side information processing apparatus. The information processing apparatus whose system must be modified shall be called a receiving-side information processing apparatus. To begin with, the receiving-side information processing apparatus is executed. Thereafter, the reception program residing in the receiving-side information processing apparatus outputs a data transfer request to the transmitting-side information processing apparatus. The transmitting-side information processing apparatus transmits requested data to the receiving-side information processing apparatus. According to the present invention, the transmitting-side apparatus should merely have a facility for transmitting data in response to a data request. A general-purpose information processing apparatus can therefore be used as the transmitting-side information processing apparatus, but any special apparatus such as the ROM writer is not needed. The receiving-side information processing apparatus activates the reception program on receipt of data, and writes the received data in the ROM.

According to the present invention, reception is executed by the reception program stored in the RAM. No limitations will be imposed on writing of data in the ROM. For example, a block of the data in the ROM can be specified freely. Moreover, when programs included in the data are rewritten, it means that the programs are modified or another programs are added. Furthermore, programs completely different from programs having been stored in the ROM can be written.

In the data rewriting method in accordance with the present invention, the transmitting-side information processing apparatus should merely have a transmission program. The receiving-side information processing apparatus should merely transfer the reception program to the RAM. Control then jumps to the reception program, whereby programs with which the ROM is written are input. Thus, one information processing apparatus can be provided with both the transmitting facility and receiving facility. Using the information processing apparatus having both the transmitting facility and receiving facility, even an end user of the information processing apparatus can rewrite data including programs. This obviates the necessity of bringing an information processing apparatus to a manufacturer or dealer so as to have data residing in the apparatus rewritten.

Incidentally, in the rewriting method and information processing apparatus in accordance with the present invention, the receiving-side information processing apparatus has a facility for checking the validity of received data. Consequently, it can be prevented that a program compatible with an information processing apparatus of a different type is written or data is rewritten with data of an older version.

Moreover, according to the present invention, data or especially programs can be rewritten between processing apparatuses employing ROMs of different specifications. When a program is run, the program proceeds with processing while rewriting part of it own contents. A sequence for the writing is different with the specifications for a ROM. When a program compatible with the specifications for a certain ROM is stored in another ROM having different specifications, the program may not execute the desired processing in some cases.

According to the present invention, a plurality of programs compatible with the different specifications for various ROMs is stored in a programmable ROM. Thus, the above subject is dealt with. For rewriting data, all the data including the plurality of versions of programs is transferred from a transmitting-side information processing apparatus to a receiving-side information processing apparatus. For running a rewritten program, the receiving-side information processing apparatus selects a program compatible with the specifications for an own ROM from among the plurality of versions of programs, and then runs the program. Thus, even when the specifications for a ROM to be employed are modified, the contents of the ROM of an older type can be rewritten with a program that can be run.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

A preferred embodiment of the present invention will be described in conjunction with the drawings.

Figure 1:
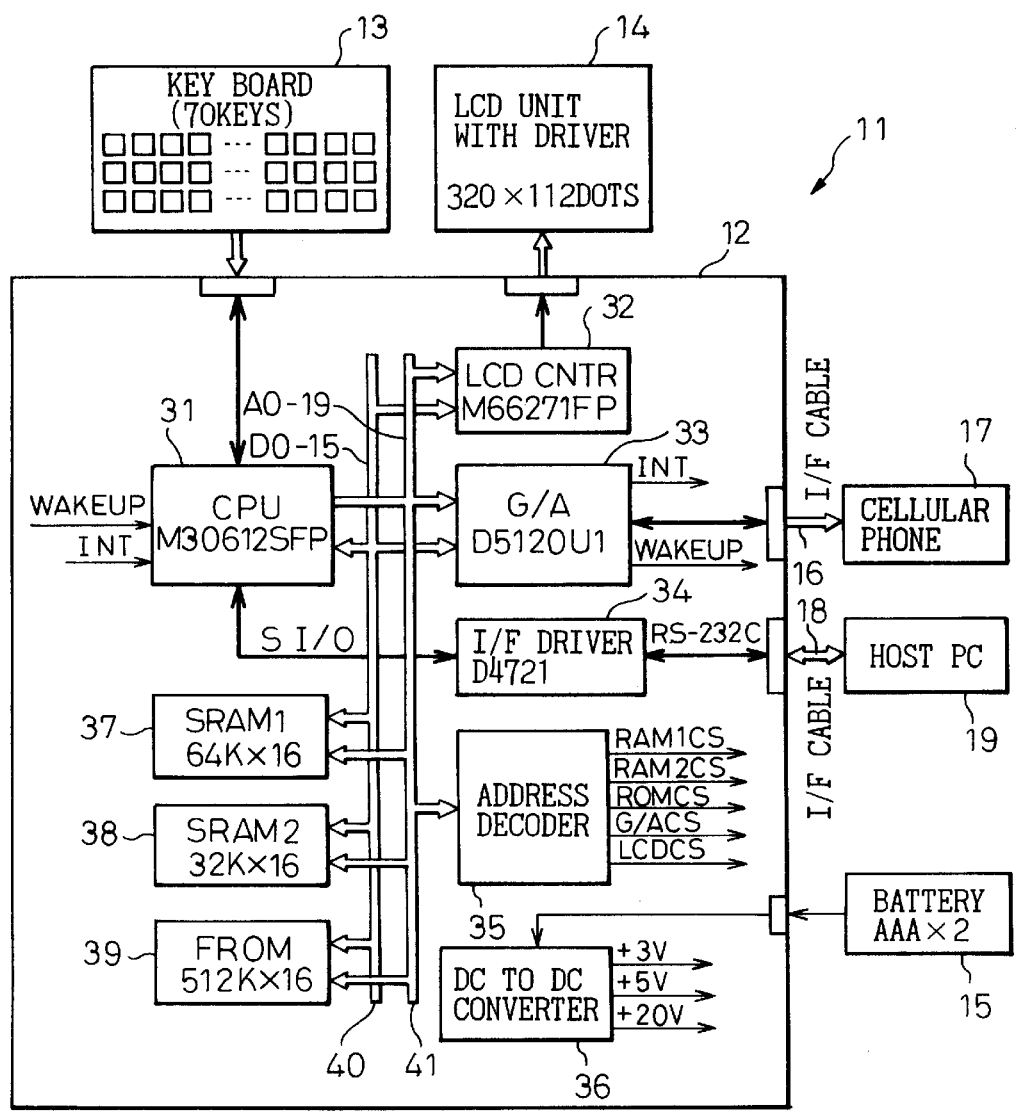
FIG. 1 shows the circuitry of an information processing apparatus to which the present invention is adapted.

FIG. 1 shows the configuration of a portable terminal to which the present invention is adapted. The present invention is not limited to the portable terminal but may be adapted to other information processing apparatuses.

A portable terminal 11 is realized by integrating a printed-circuit board 12, a keyboard 13, a display unit 14, and a power source 15 into a housing. The housing is compact enough to be thrust into a pocket and to be carried. In the illustrated example, a compact keyboard having 70 keys is adopted as the keyboard 13. The display unit 14 is composed of a liquid crystal display unit and drivers. Two AAA batteries are used as the power source 15.

The portable terminal 11 can be connected to a computer 19 using an interface cable 18. The portable terminal 11 can therefore interchange data with the computer 19. In particular, according to the present invention, a portable terminal having the same specifications as those for the portable terminal 11 may be connected as the computer 19 to the portable terminal 19. Thus, data can be rewritten or data in a remote portable terminal can be rewritten. Moreover, the portable terminal 11 can be connected to a portable telephone 17 using an interface cable 16. The use of the portable telephone 17 enables connection to any other computer over a telephone network and to eventually transfer of data over it.

Components mounted on the printed-circuit board 12 will be described. A CPU 31, a display unit control unit 32, a gate array 33, an interface driver 34, an address decoder 35, a DC-to-DC converter 36, a first static RAM (SRAM) 37, a second SRAM 38, and a flash ROM (FROM) 39 are mounted on the printed-circuit board 12. The components are interconnected over buses 40 and 41. The gate array 33 is a circuit for connecting the portable telephone 17 to the portable terminal 11. The interface driver 34 is a circuit for connecting the portable terminal 11 to the computer 19. The DC-to-DC converter 36 converts a dc voltage of 3 V supplied from the power source 15 into a dc voltage of +3 V, +5 V, or +20 V. The FROM 39 is an electrically erasable programmable ROM.

Figure 2:
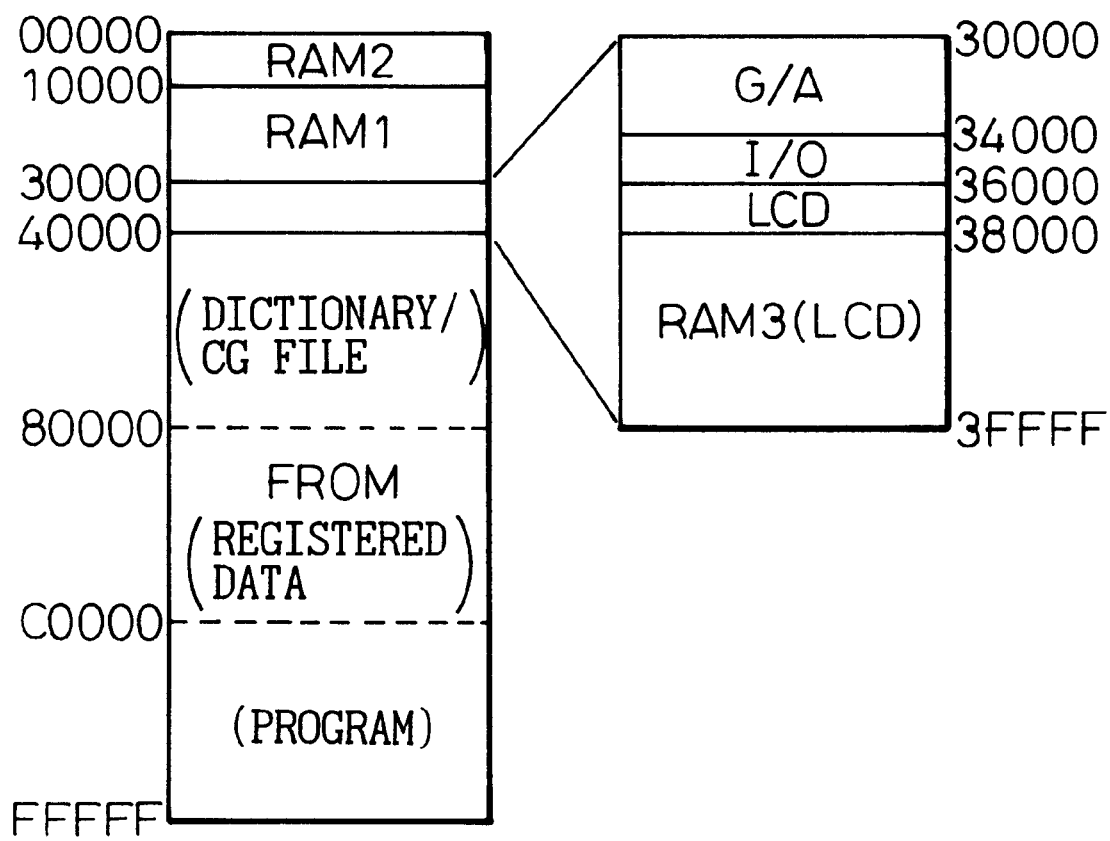
FIG. 2 shows the contents of an address map for the information processing apparatus shown in FIG. 1.

FIG. 2 shows the contents of an address map for the circuits shown in FIG. 1. Addresses 00000 to 10000 are assigned to the second SRAM 38. Addresses 10000 to 30000 are assigned to the first SRAM 37. Addresses 30000 to 34000 are assigned to the gate array 33. Addresses 34000 to 36000 are assigned to the interface driver 34. Addresses 36000 to 38000 are assigned to the display unit control unit 32. Addresses 38000 to 3FFFF are assigned to the third RAM in the liquid crystal display unit. Addresses 40000 to FFFFF are assigned to a data area in the FROM 39. In the data area in the FROM 39, addresses 40000 to 80000 are assigned to a dictionary/computer graphic file, Addresses 80000 to C0000 are assigned to a registered data area. Addresses C0000 to FFFFF are assigned to a program area.

Figure 3A:
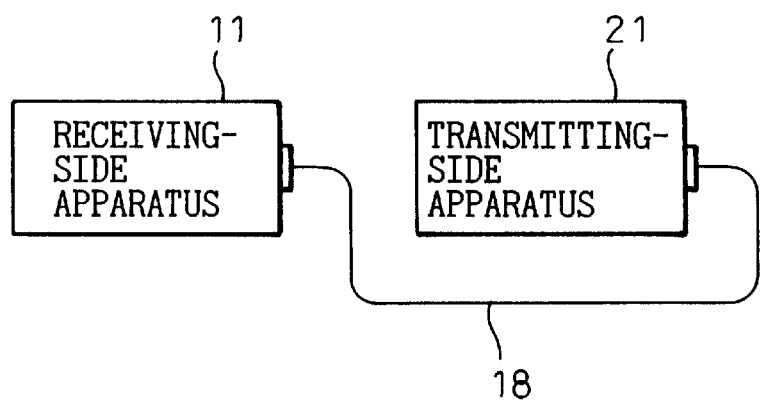
FIG. 3A and FIG. 3B show relationships of connections established for data transfer.
Figure 3B:
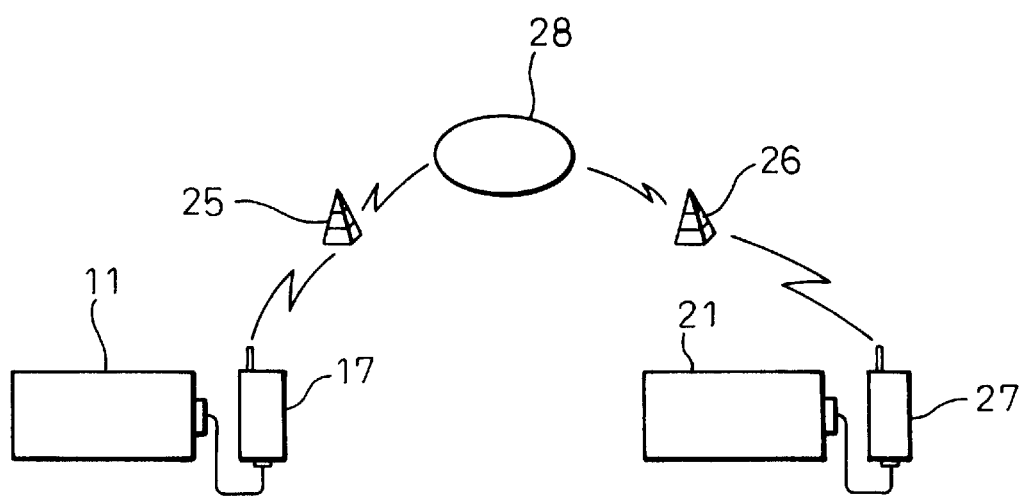

FIG. 3A and FIG. 3B are diagrams showing relationships of connections established for data transfer.

In FIG. 3A, a receiving-side portable terminal 11 attempting to rewrite data is connected to a transmitting-side portable terminal 21 having new data over an interface cable 18. Data rewriting is carried out by manipulating the keyboard 13 according to the display on the display unit 14 at the portable terminals 11 and 21. The transmitting-side portable terminal 21 need not be of the same type as the receiving-side one. Moreover, a personal computer will do.

Now, a procedure of rewriting data will be described below.

A maintenance mode is invoked by manipulating the keyboard 13 at the terminals 11 and 21. A data transfer mode is selected from among the sub modes of the maintenance mode. The receiving-side portable terminal 11 specifies a range to be rewritten. For example, the whole data area in the FROM 39 shown in FIG. 2 (addresses 40000 to FFFFF) or only the program area (addresses C0000 to FFFFF) is specified. Receiving Side is set in the receiving-side portable terminal 11, and Transmitting Side is set in the transmitting-side portable terminal 21. A Start key is then pressed at the portable terminals 11 and 21. Data transfer is automatically started.

FIG. 3B shows an example of rewriting message data or the like by interconnecting two portable terminals over a telephone network. For rewriting message data resident in a portable terminal, a user owning the receiving-side portable terminal 11 communicates with a user owning the transmitting-side portable terminal 21. For the communication, the users may speak to each other by telephone. Alternatively, the portable terminals may be connected to portable telephones and may then communicate with each other.

For rewriting message data, as shown in FIG. 3B, a portable telephone 17 is connected to the receiving-side portable terminal 11, and a portable telephone 27 is connected to the transmitting-side portable terminal 21. In this state, one portable terminal is called by the other portable terminal. The two portable terminals 11 and 21 are then interconnected via the portable telephone 17, a radio base station 25, a telephone network 28, a radio base station 26, and the portable telephone 27. Thereafter, each user manipulates the keyboard. Message data is transmitted from the transmitting-side portable terminal 21. The message data residing in the receiving-side portable terminal 11 is then rewritten with the transmitted data.

The processing will be described below.

Figure 4:
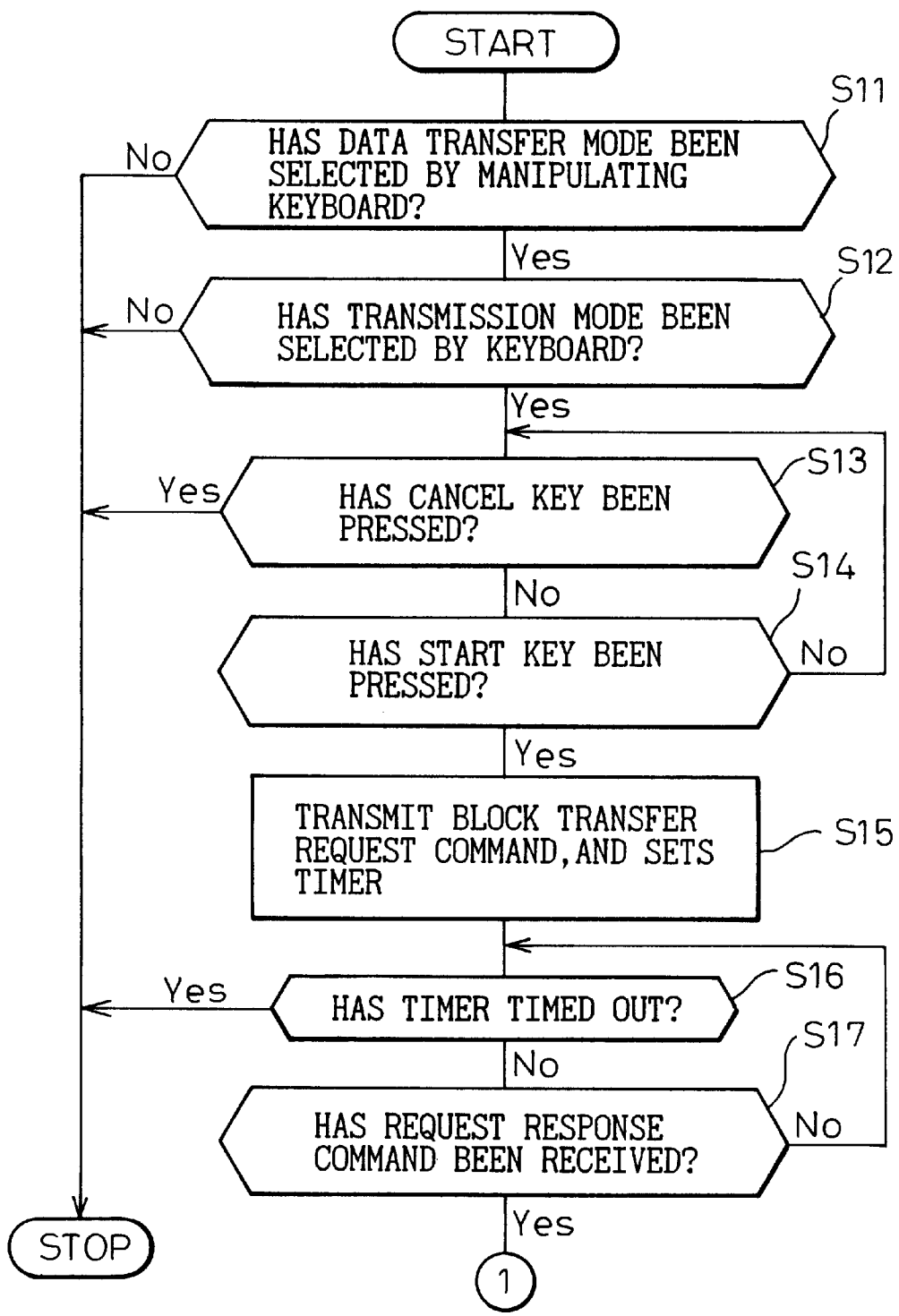
FIG. 4 and FIG. 5 are flowcharts describing transmission of Data Rewriting from a transmitting-side portable terminal.
Figure 5:
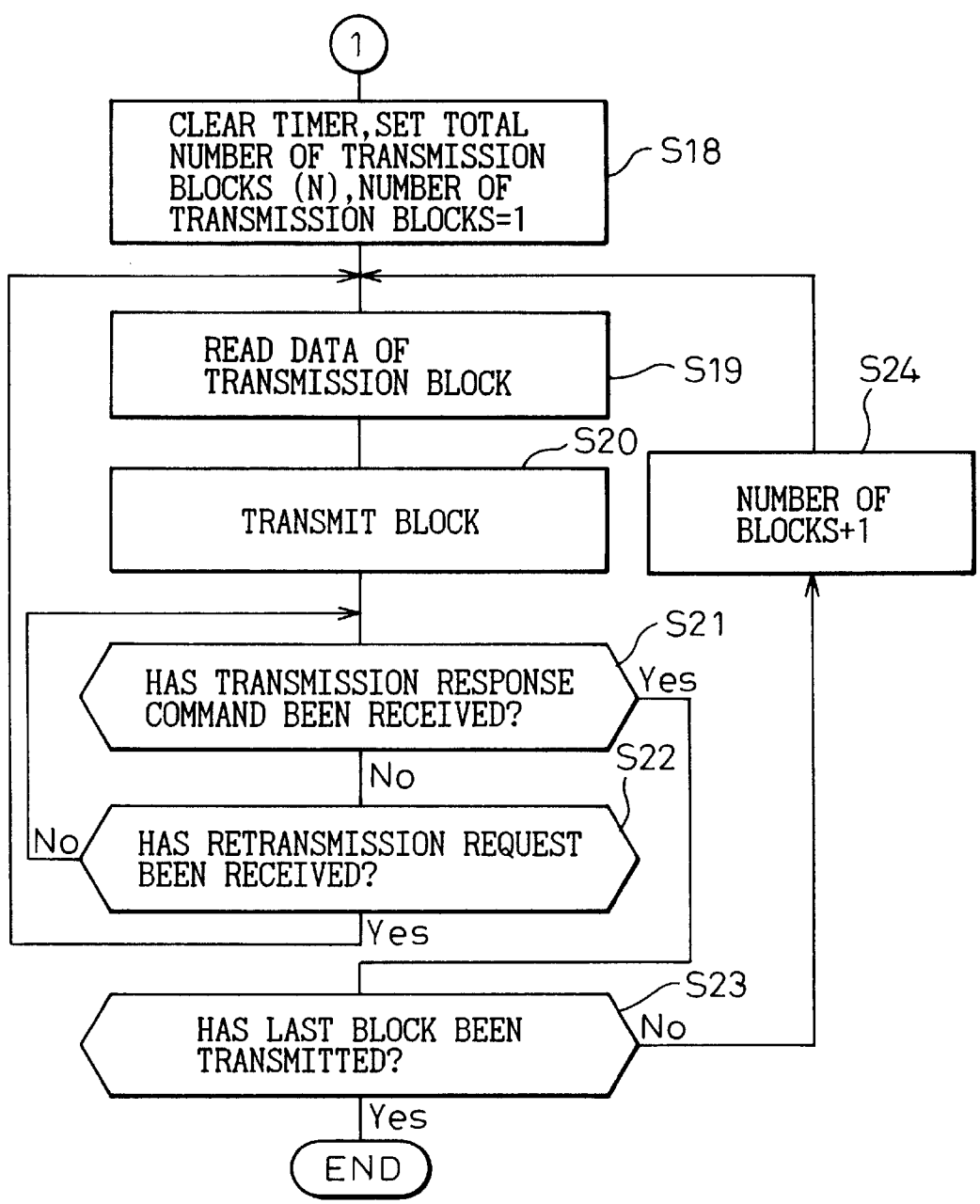

FIG. 4 and FIG. 5 describe a data transmission flow followed by the transmitting-side portable terminal 21. The maintenance mode is invoked by manipulating the keyboard 13, and the data transfer mode is then selected (step S11). A transmission mode is selected from among the sub modes of the data transfer mode (step S12). If a Cancel key is not pressed (in the negative at step S13) but a Start key is pressed (in the affirmative at step S14), control is passed to S15. Data transmission is then started. If any other key is pressed at step S11 or S12 or if the Cancel key is pressed at step S13, the data transmission is terminated. If any other key is pressed at step S14, control is returned to step S13. The same operations are repeated until the Cancel key or Start key is pressed.

At step S15, a program transfer request command is transmitted to the receiving-side portable terminal 11. This causes a timer to start counting. The request command notifies completion of preparations to be made for transmitting data. The type of the transmitting-side portable terminal 21 and the version of data are transmitted at the same time. The limitation of the time during which reception of a request response command is awaited is set in the timer. It is checked at step S16 if the timer has timed out. If the timer has timed out, the data transmission is terminated. If the timer has not timed out, control is passed to step S17. At step S17, it is judged whether the request response command has been received. If the request response command has not been received, control is returned to step S16. The data transmission is terminated unless the request response command is received from the receiving-side portable terminal 11 within the time set in the timer.

The request response command is transmitted to the transmitting side portable terminal 21 when preparations for reception have been made by the receiving-side portable terminal 11. If the request response command has been received, control is passed to step S18. At step S18, the timer is cleared. The total number of transmission blocks (N) contained in the received request response command is set in a register for holding the total number of transmission blocks. 1 is set in a register for holding the number of transmission blocks. Thereafter, the data of one block is read from the start of data requested to be transmitted (step S19). The block is then transmitted to the receiving-side portable terminal (step S20). It is judged whether a transmission response command has been received from the receiving-side portable terminal (step S21). It is judged whether a retransmission request signal has been received (step S22).

If the receiving-side portable terminal 11 has received the data of one block normally, the transmission response signal is transmitted. If it has not received the data normally, the retransmission request signal is transmitted. If the retransmission request signal has been received, control is returned from step S22 to step S19. The processing of re-transmitting the same block is then executed. If the transmission response signal has been received, control is passed to step S23.

At step S23, it is judged whether the value in the register for holding the number of transmission blocks has reached the total number of transmission blocks (N). If the value has not reached, the number of transmission blocks is incremented by one at step S24. Control is then returned to step S19. The next block is then transmitted. The above operations are repeated. When the last transmission block has been transmitted, the value in the register for holding the number of transmission blocks becomes equal to the total number of transmission blocks N. The data transmission is then terminated.

Figure 6:
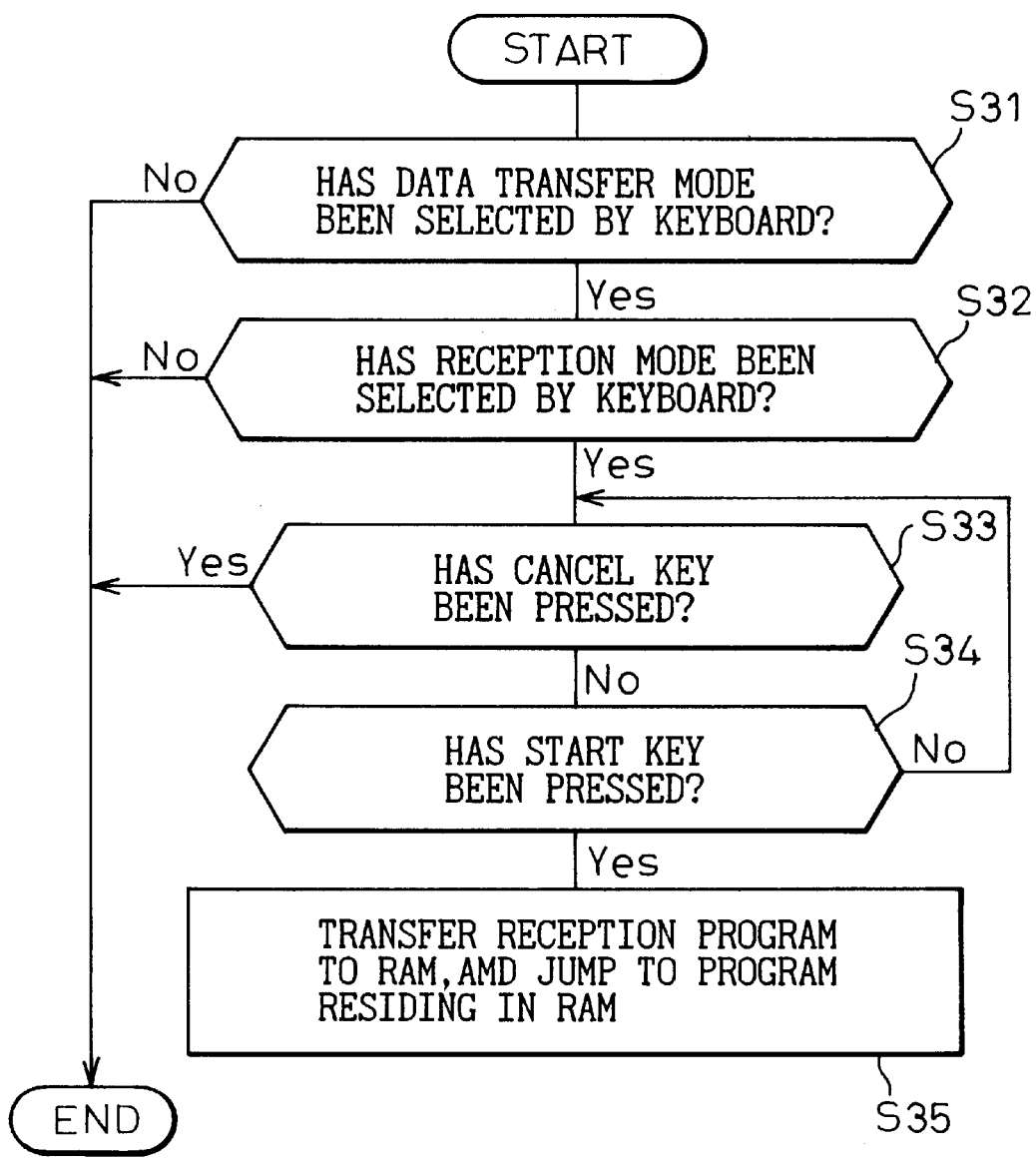
FIG. 6 is a flowchart describing first reception of Data Rewriting by a receiving-side portable terminal.

FIG. 6 described the first half of a data reception flow to be followed by the receiving-side portable terminal 11.

The maintenance mode is invoked by manipulating the keyboard 13. The data transfer mode is then selected (step S31). A reception mode is then selected from among the sub modes of the transfer mode (step S32). If the Cancel key is not pressed (in the negative at step S33) but the Start key is pressed (step S34), control is passed to step S35. Data reception is then started. If any other key is pressed at step S31 or S32, or if the Cancel key is pressed at step S33, the data reception is terminated. If any other key is pressed at step S34, control is returned to step S33. The same operations are repeated until the Cancel key or Start key is pressed.

At step S35, a reception program out of programs stored in the FROM 39 is transferred to the first SRAM 37. A program counter is then set to the leading address of the reception program transferred to the SRAM 37. Control then jumps to the program.

FIG. 1 describes the second half of the data reception flow to be followed by the receiving-side portable terminal 11.

Figure 7:
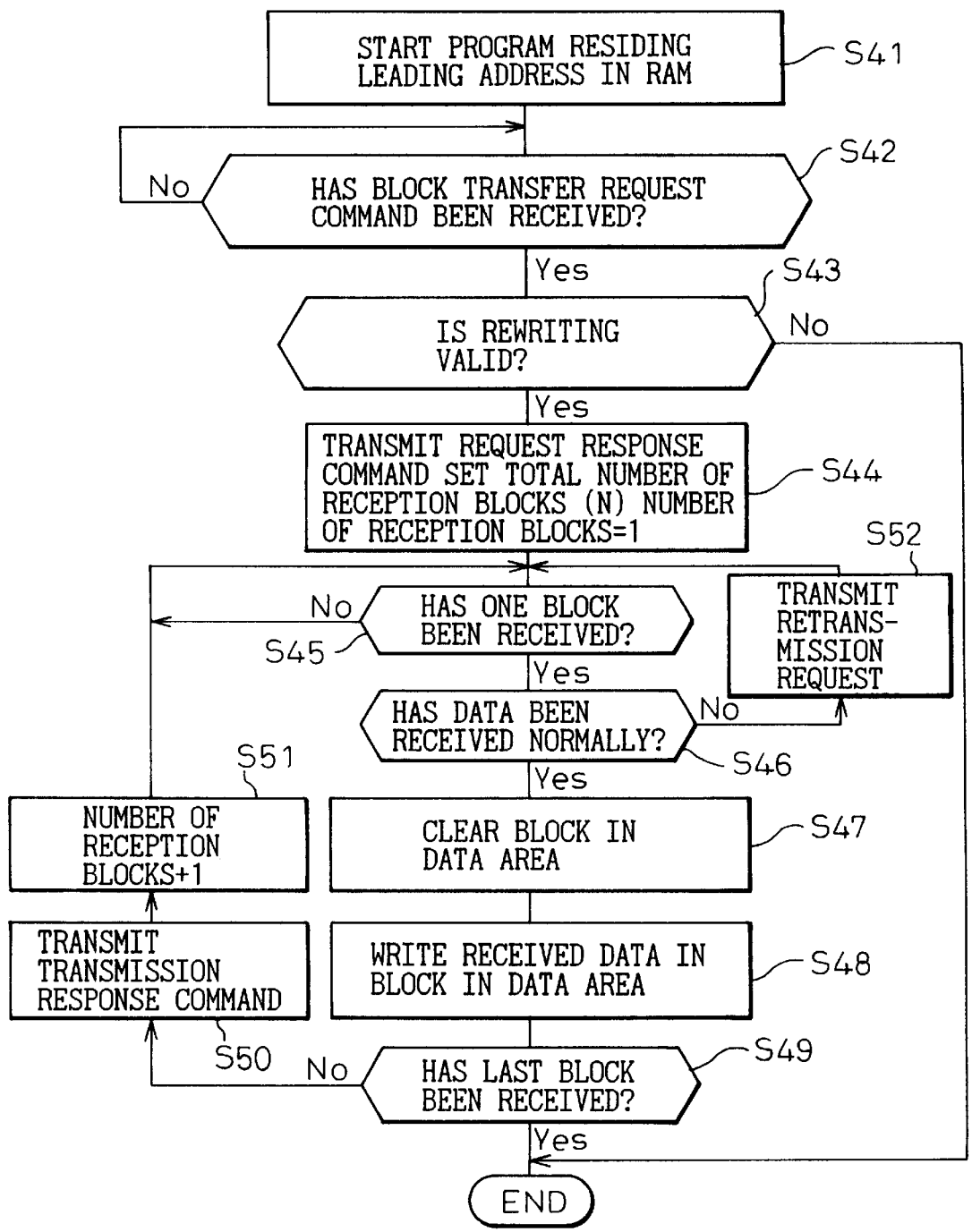
FIG. 7 is a flowchart describing second reception of Data Rewriting by the receiving-side portable terminal.

When control has jumped to the leading address of the program stored in the SRAM 37 at step S35 in FIG. 6, the processing described in FIG. 7 is started (step S41). Then (step S42) a block transfer request command (See step S15 in FIG. 4 describing the flow to be followed by the transmitting-side portable terminal) is received from the transmitting-side portable terminal 21. On receipt of the request command, the validity of rewriting is checked based on the contents of the command (step S43). For checking the validity, it is judged whether the type of the transmitting-side portable terminal 21 matches the type of the portable terminal, or whether the version of data is newer than that of the old data. Consequently, it can be prevented that an inoperable program or data of an older version is written in the ROM 39 in the receiving-side portable terminal 11.

When the validity of rewriting has been checked at step S43, a request response command is transmitted to the transmitting-side portable terminal 21 at step S44. A range of data (for example, the whole of the data area or only the program area) to be transmitted from the transmitting-side portable terminal 21 is contained in the command. The total number of blocks (N) of data to be received is set in a register for registering the total number of reception blocks in the receivingside portable terminal. 1 is set in a register for registering the number of reception blocks.

Figure 8:
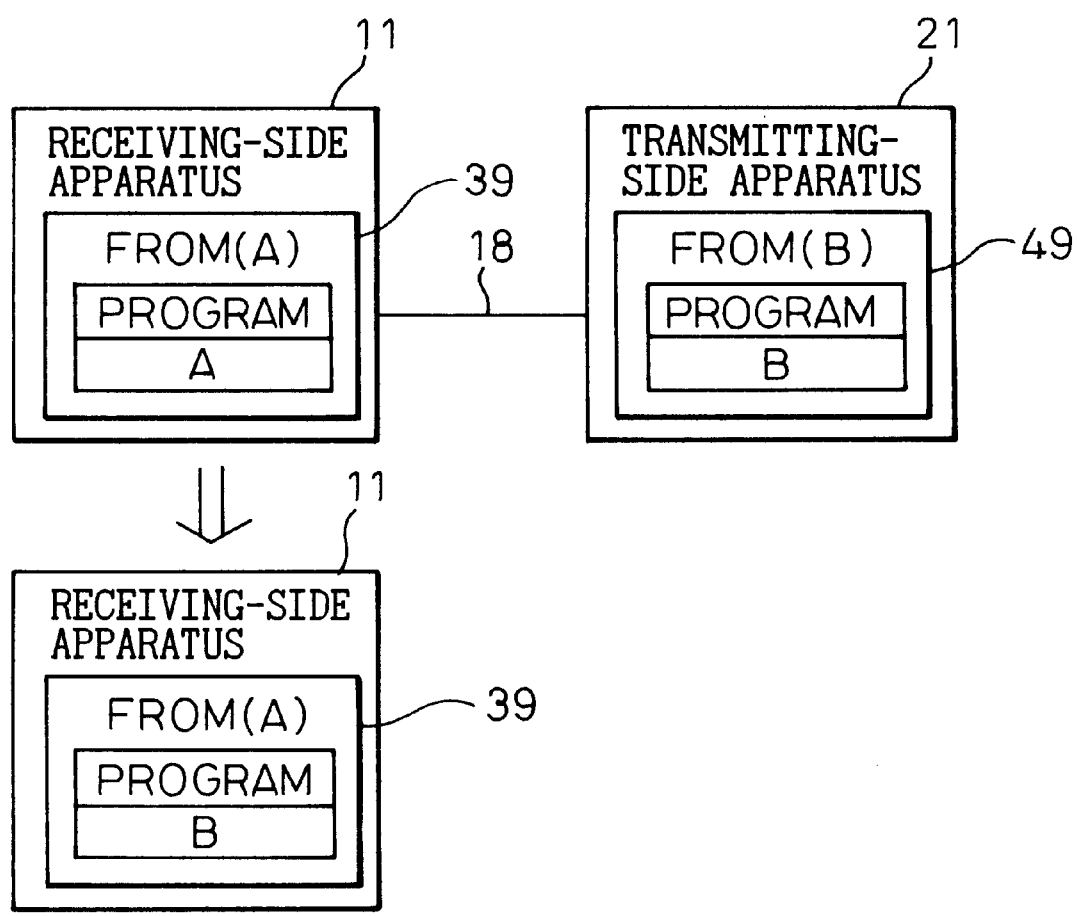
FIG. 8 is a diagram for explaining the relationship between a program and ROM.

Thereafter, reception of data occurs at step S45. If the data of one block has been received (in the affirmative at step S45), it is checked if normal data has been received (step S46). If data has an abnormality, a retransmission request signal is transmitted (step S52). Control is then returned to step S45. With transmission of the retransmission request signal, the transmitting-side portable terminal re-transmits the data of the same one block (See step S22 in FIG. 5). If only one block of data has been received normally at step S46, one block in the FROM 39 shown in FIG. 8 is cleared (step S47). The received data of one block is written in the cleared block (step S48).

It is checked if the received data of one block is the last data (step S49). This is judged by checking if the value in the register for holding the number of reception blocks has reached the total number of reception blocks N. If the value has not been reached, some transmission blocksremain untreated. A transmission response command is then transmitted to the transmitting-side portable terminal 21 at step S50. The register for holding the number of reception blocks is then incremented by one at step S51. Control is then returned to step S45.

The transmitting-side portable terminal 21 receives the transmission response command (See step S21 in FIG. 4). The data of the next one block is then transmitted to the receiving-side portable terminal 11. The receiving-side portable terminal 11 repeats the processing of step S45 to step S52. If it is judged at step S49 that the reception of the last block has been completed (the value in the register for holding the number of reception blocks equals to the total number of reception blocks N), the data reception is terminated.

According to the present invention, a plurality of programs should be prepared so that they can be stored in the FROM 39. Consequently, data residing in different types of portable terminals can be rewritten.

As far as an information processing apparatus is concerned, data including programs may be upgraded to a higher version or the type of information processing apparatus may be remodeled. For example, the FROM 39 may be changed from an FROM manufactured by A Inc., which has been employed in the past, to an FROM manufactured by B Inc. Supposing a ROM is remodeled, programs to be stored in the ROM must be programs compatible with a writing sequence adopted for the ROM. This is because when a program is run, the program proceeds with processing while rewriting part of the contents thereof. The writing sequence according to which data is rewritten is different with the specifications for a ROM. The programs to be stored in a ROM must therefore be programs compatible with the writing sequence or the specifications for the ROM.

Referring to FIG. 8, the relationship between the FROM 39 and a program stored therein will be described below.

As shown in FIG. 8, the FROM 39 manufactured by A Inc. is mounted in the old type of portable terminal 11. A writing control program (A) to be installed separately from programs required for operating the portable terminal is stored in the FROM 39. On the other hand, an FROM 49 manufactured by B Inc. is mounted in the remodeled type of portable terminal 21. A writing control program (B) to be installed separately from programs required for operating the portable terminal is stored in the FROM 49. In this state, the writing control programs compatible with the own FROMs 39 and 49 are stored in the portable terminals 11 and 21 respectively. The portable terminals can therefore operate normally.

Assume that the old type of portable terminal is used as the receiving-side portable terminal 11 and the new type of portable terminal is used as the transmitting-side portable terminal 21. Both the portable terminals are interconnected over the interface cable 18, and the writing control program (B) is transmitted. The writing program in the receiving-side portable terminal 11 is then rewritten with the new writing control program (B) stored in the transmitting-side portable terminal 21. In this case, the receiving-side portable terminal 11 has to run the writing control program compatible with the FROM manufactured by B Inc. on the FROM 39 manufactured by A Inc. Writing cannot be achieved because of the difference between the writing sequences.

Figure 9:
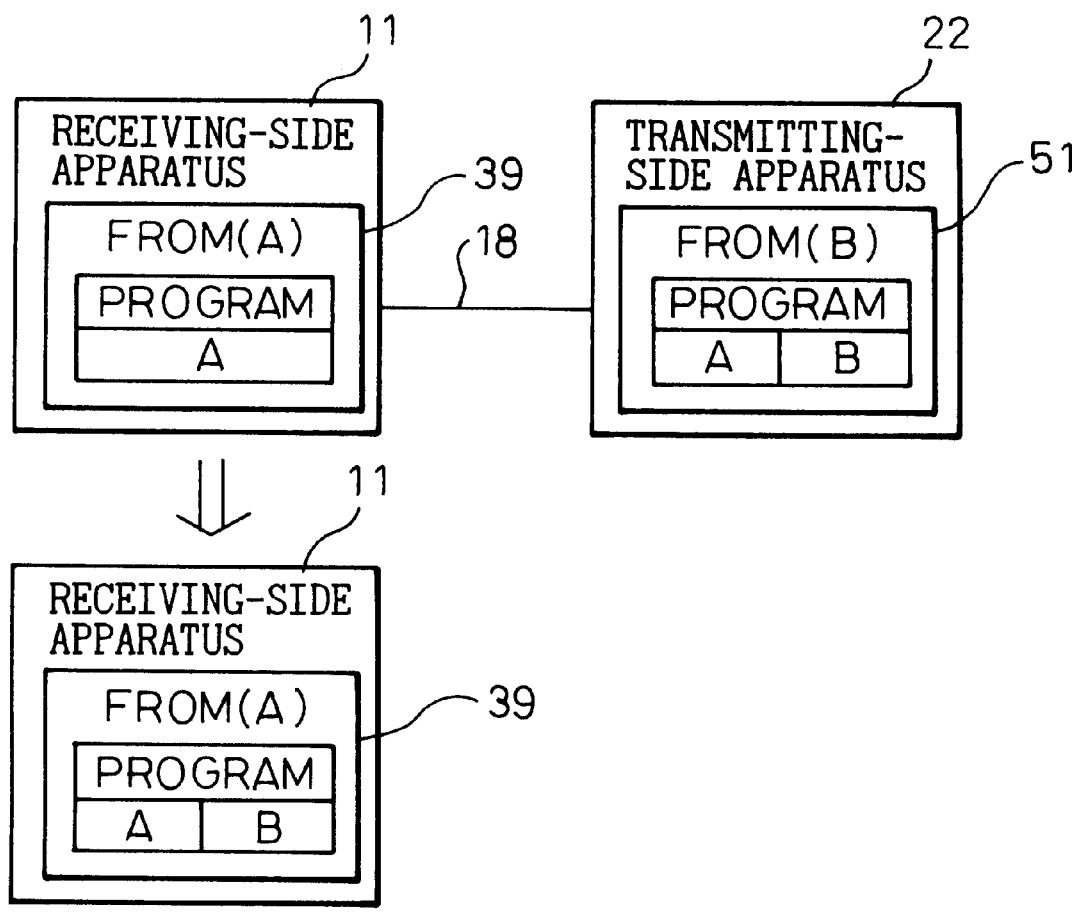
FIG. 9 and FIG. 10 show procedures of operations for storing a plurality of programs in a ROM and transferring it in the form of data.
Figure 10:
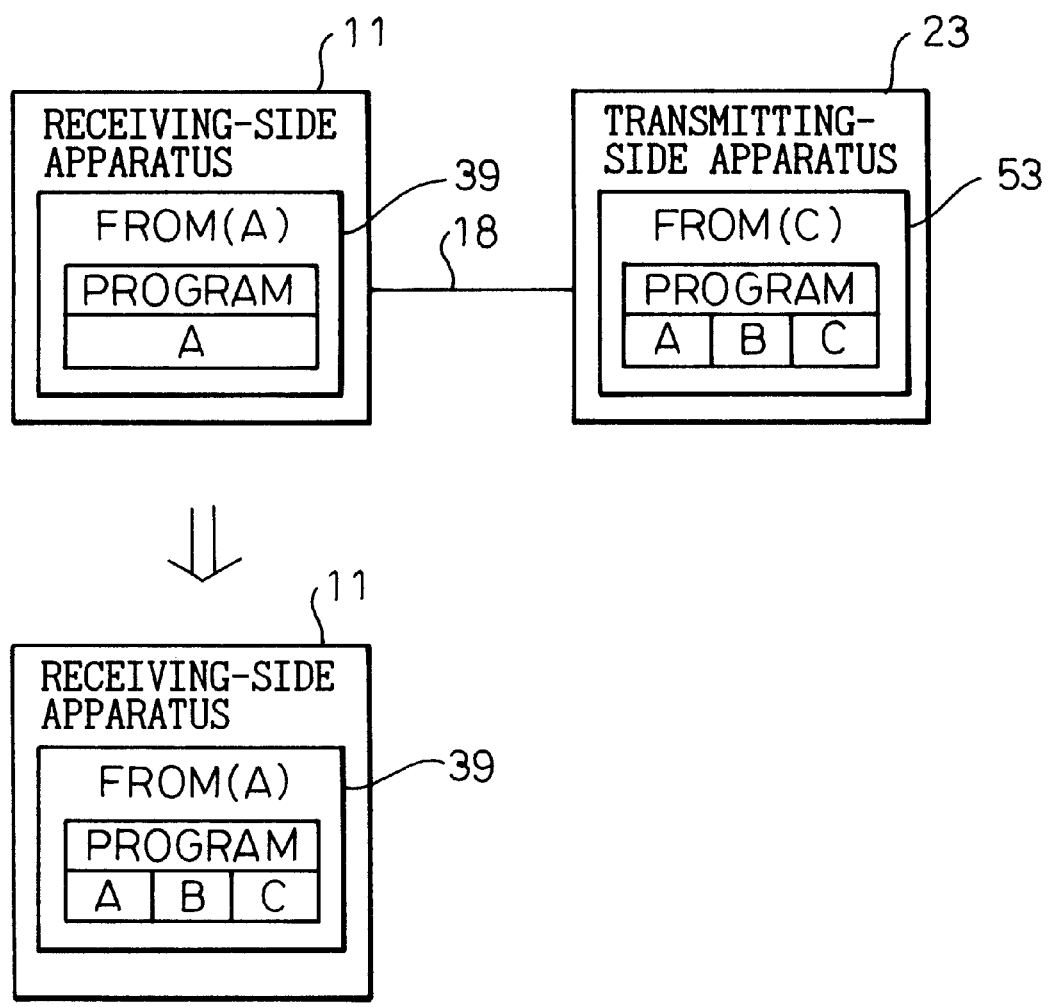

FIG. 9 and FIG. 10 show examples in which programs can be transmitted according to the present invention between the portable terminals 22 and 11 whose FROMs have mutually different specifications.

In the example shown in FIG. 9, the receiving-side portable terminal 11 is of the oldest type employing an FROM manufactured by A Inc. A writing control program compatible with the FROM manufactured by A Inc. is stored as only one writing control program. Moreover, the transmitting-side portable terminal 22 is of a new type employing an FROM 51 manufactured by B Inc. A writing control program (B) compatible with the FROM manufactured by B Inc. and a writing control program (A) compatible with the older type of FROM manufactured by A Inc. are stored in the FROM 51 of the portable terminal 22 manufactured by B Inc. In the portable terminal 22 manufactured by B Inc., the specifications for the incorporated FROM 51 are checked to see that the FROM is manufactured by B Inc. The writing control program (B) compatible with the FROM is therefore selected and run.

For transferring programs from the transmitting-side portable terminal 22 to the receiving-side portable terminal 11, both the terminals 11 and 21 are interconnected over the interface cable 18. Data stored in the program area (addresses 40000 to FFFFF) is then transferred from the transmitting-side portable terminal to the receiving-side portable terminal. Eventually, as shown in the lower part of FIG. 9, the writing control program (A) compatible with the FROM manufactured by A Inc. and the writing control program (B) compatible with the FROM manufactured by B Inc. become resident in the receiving-side portable terminal 11. In the receiving-side portable terminal 11, the specifications for the incorporated FROM 39 are checked to see that the FROM is manufactured by A Inc. The writing control program (A) compatible with the FROM is therefore selected and run. Thus, even if a type of portable terminal is remodeled and the specifications for an incorporated FROM are modified, programs can be migrated to an older type of portable terminal.

In the example shown in FIG. 10, programs are transferred from a portable terminal 23, which is of a newer type than the portable-terminal 22 shown in FIG. 9, to the portable terminal 11 of the oldest type.

The receiving-side portable terminal 11 is of the oldest type. A program compatible with the FROM manufactured by A Inc. is stored as a writing control program. Moreover, the transmitting-side portable terminal 23 is of the latest type, and an FROM 53 manufactured by C Inc. is employed therein. A writing control program (C) compatible with the FROM manufactured by C Inc. as well as a program (A) compatible with the older type of FROM manufactured by A Inc. and a program (B) compatible with the older type of FROM manufactured by B Inc. are stored in the FROM 53 manufactured by C Inc.

For transferring programs from the transmitting-side portable terminal 23 to the receiving-side portable terminal 11, both the portable terminals 11 and 21 are interconnected over the interface cable 18. Data stored in the program area (addresses 40000 to FFFFF) is transferred from the transmitting-side portable terminal to the receiving-side portable terminal. Eventually, as shown in the lower part of FIG. 10 indicated with an arrow, the writing control program (A) compatible with the FROM manufactured by A Inc., the writing control program (B) compatible with the FROM manufactured by B Inc., and the writing control program (C) compatible with the FROM manufactured by C Inc. become resident in the receiving-side portable terminal 11. In the receiving-side portable terminal 11, the specifications for the incorporated FROM 39 are checked to see that the FROM is manufactured by A Inc. The writing control program (A) compatible with the FROM is therefor selected and run. As mentioned above, a type of portable terminal may be remodeled and the specifications for an incorporated FROM may be modified accordingly. Nevertheless, if all the writing control programs compatible with FROMs of older types are held resident, programs can be migrated to any portable terminal of an older type.

Moreover, in FIG. 10, the old type of portable terminal 11 may have the writing control programs (A, B, C) thereof rewritten. In this case, the portable terminal 11 can transmit programs to a new type of portable terminal (for example, the portable terminal 22 in FIG. 9) in which writing control programs of older versions reside. Thus, programs in the new type of portable terminal can be rewritten with the transmitted programs.

What is claimed is:

1. A method of rewriting data, which includes programs, stored in a programmable ROM in a receiving-side information processing apparatus by transmitting data including programs from a transmitting-side information processing apparatus, said data rewriting method comprising steps in which:

for rewriting data, said receiving-side information processing apparatus transfers a reception program included in the data stored in said ROM to a RAM, then runs the reception program stored in said RAM, and outputs a data transfer request to said transmitting-side information processing apparatus;

said transmitting-side information processing apparatus transmits data in response to a data transmitting request from said receiving-side information processing apparatus; and said receiving-side information processing apparatus runs the reception program stored in said RAM to write the received data in said ROM.

2. A method for rewriting data in an information processing apparatuses in which data including programs is stored in a programmable ROM, said data rewriting method comprising the steps of:

for rewriting data, transferring a reception program included in the data stored in said ROM to a RAM;

outputting a data transfer request to an apparatus for transmitting data by running the reception program stored in said RAM; and on receipt of data, writing the received data in said ROM.

3. A method for rewriting data in an information processing apparatuses in which data including programs is stored in a programmable ROM, said data rewriting method comprising the steps of:

for rewriting data, transferring a reception program included in the data stored in said ROM to a RAM;

outputting a data transfer request to an apparatus for transmitting data by running the reception program stored in said RAM; and on receipt of data, checking the validity of the received data, and, if the data is valid, writing the received data in said ROM.

4. An information processing apparatus capable of data rewriting, comprising:

a programmable ROM in which data including programs is stored;

a RAM in which a reception program is stored temporarily;

means for rewriting data, transferring the reception program included in the data stored in said ROM to said RAM, and means for outputting a data transfer request to a transmitting-side information processing apparatus by running the reception program stored in said RAM, and writing received data in said ROM.

5. An information processing apparatus capable of data rewriting, comprising:

a programmable ROM in which data including programs is stored;

a RAM in which a reception program is stored temporarily;

means for, for rewriting data, transferring the reception program included in the data stored in said ROM to said RAM;

means for outputting a data transfer request to a transmitting-side information processing apparatus by running the reception program stored in said RAM, and writing received data in said ROM; and means for, in response to an external data transfer request, transmitting data stored in said ROM to an external apparatus.

6. An information processing apparatus capable of data rewriting, comprising:

a programmable ROM in which data including programs is stored;

a RAM in which a reception program is stored temporarily;

means for, for rewriting data, transferring the reception program included in the data stored in said ROM to said RAM;

means for outputting a data transfer request to a transmitting-side information processing apparatus by running the reception program stored in said RAM, checking the validity of received data, and, if the data is valid, writing the received data in said ROM.

7. An information processing apparatus, comprising:

a programmable ROM in which data including programs is stored; and means for, in response to an external data transfer request, transmitting the data stored in said ROM to an external apparatus.

8. An information processing apparatus according to any of claims 4 to 7, wherein said ROM holds a plurality of versions of programs compatible with ROMs of different specifications, further comprising means for, in response to the external data transfer request, transmitting all the data stored in said ROM to the external apparatus.

9. A portable terminal capable of data rewriting, comprising:

a programmable ROM in which data including programs is stored;

means for, for rewriting the data stored in said ROM, outputting a data transfer request to a transmitting-side portable terminal and writing received data in said ROM; and means for, in response to an external data transfer request, transmitting the data stored in said ROM to an external apparatus.

10. A portable terminal capable of data rewriting according to claim 9, further comprising means for connecting said portable terminal to a portable telephone and a communicating means for transferring the data using said portable telephone.

* * * * *